July 18, 1950  A. M. CHAMBERS, JR  2,515,629
GARTER SPRING
Original Filed Feb. 9, 1945

INVENTOR
ALBERT M. CHAMBERS JR.
BY Fraser, Myers & Manley
ATTORNEYS

Patented July 18, 1950

2,515,629

UNITED STATES PATENT OFFICE 2,515,629

GARTER SPRING

Albert M. Chambers, Jr., Pittsford, N. Y., assignor to The Garlock Packing Company, Palmyra, N. Y., a corporation of New York Original application February 9, 1945, Serial No. 577,113, now Patent No. 2,434,484, dated January 13, 1948. Divided and this application March 29, 1945, Serial No. 585,535

2 Claims. (Cl. 267—1)

This invention relates to improvements in garter springs, more particularly those which are of small sectional diameter relatively to their circumferential length. This application is a division of my co-pending application, Serial No. 577,113, filed February 9, 1945, now Patent Number 2,434,484, issued January 13, 1948.

The principal object of this invention is to provide garter springs, of substantial circumferential length, which, despite being of relatively small sectional diameter and employing spring wire suitable for such small diameter, may nevertheless, within usual limits of extension and compression, be capable of applying a substantial contractile or expansion force upon a flexible annular element to urge the latter inwardly or outwardly.

Another object is to provide such garter springs, of the expansion type, having inherent characteristics obviating or minimizing any tendency in the garter spring, to become deformed or distorted, when the spring is compressed into a flexible annular element to be expanded.

Other objects and advantages of the invention may be observed from the following specification and the accompanying drawing.

Garter springs ordinarily are formed by taking a length of coil spring and connecting its ends together to form a circle. Such springs of the tension type may be stretched over a flexible circular element to contract it or, in the compression type may be placed within such an element to expand it.

Where garter springs are of fairly substantial sectional diameter relatively to their circumferential length, little difficulty is encountered in making the spring of such gauge and other characteristics of spring wire and forming it in coils of such diameter as to yield the particular tension characteristics for which it is designed. However, where a mechanical structure requires a garter spring of relatively small sectional diameter as compared to its circumferential length, considerable difficulty is encountered. For example, if such a garter spring were to have coils as small as about $\tfrac{3}{16}$ inch or $\tfrac{1}{4}$ inch in diameter, and if the circumferential length were to be very substantial, say, upwards of 90 inches in length, it is well understood that, as the selection of spring wire which could be used in a spring of such small diameter would be quite limited, it would be difficult, indeed, to provide such a spring, of continuous coils throughout its entire circumferential length, which would have the proper characteristics to yield the desired contractile or expansive force.

A further problem is encountered in connection with garter springs of the compression or expansible type, in that such springs, if of continuous coils forming a circle, have a tendency to become deformed to a waved or snake-like shape, unless special means are provided to overcome that difficulty.

These problems may be better understood by reference to my mentioned co-pending application which discloses oil seal structures wherein this invention may be advantageously employed. According to those disclosures, garter springs are provided in oil seals for use in connection with shafts of very substantial diameter. In several embodiments, disclosed in that application, contractile garter springs are employed to contract a sealing lip upon a shaft, and, in another embodiment therein, an expansion garter spring is employed to expand a sealing lip into engagement with the housing into which the shaft extends. The requirements of those structures are such that the oil seals therein occupy spaces of approximately one inch between the shaft and the housing into which the shaft extends. Hence, the oil seal, radially, is only about one inch in cross sectional width, but it is upwards of 90 inches in circumferential length; and the garter springs used in such oil seals, to hold the sealing lip of the oil seal into contact with either the shaft or the housing, must necessarily have a sectional diameter of only about $\tfrac{3}{16}$ inch or $\tfrac{1}{4}$ inch and a circumferential length of upward of 90 inches.

These problems are obviated, by the present invention, by making the garter spring of alternate extensible and non-extensible portions interconnected in the form of a circle. In compression garter springs the two types of portions just mentioned are preferably assembled by rigid connections therebetween, while, in tension garter springs, the connections between the several extensible and non-extensible parts need not necessarily be rigid, but the said parts, if desired, may be merely linked together. The non-extensible portions preferably have some flexibility, and the aggregate circumferential length of the several extensible portions may be so reduced that spring wire, of the characteristics suitable for coil springs of such small sectional diameter, may be used, while limiting the extension characteristics of the garter spring so that it may have the capacity to establish the contractile or expansive forces which it is intended to exert upon a flexible element with which it is associated.

Although the present invention may be practised in various ways, nevertheless, the illustrative embodiments, shown in the accompanying drawings, should serve to give an understanding of the invention. In the drawing.

Figure 1:
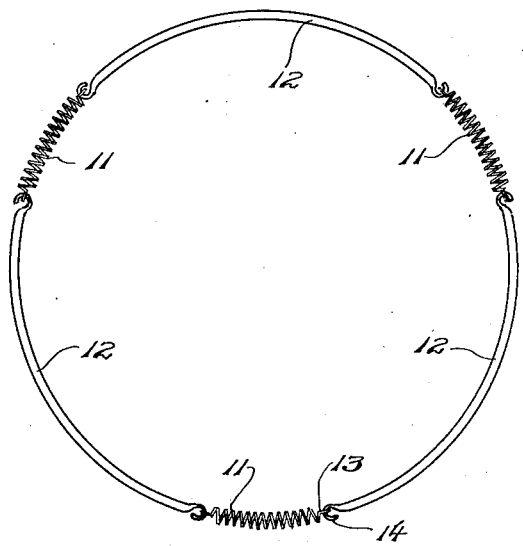
Figure 1 is an elevational view, illustrating a contractile spring according to the present invention.
Figure 1A:
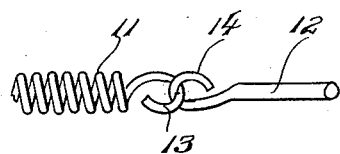
Fig. 1a is a fragmentary view, illustrating one of various ways in which the extensible and non-extensible portions of the spring of Fig. 1 may be interconnected.

Referring to Fig. 1, the contractile garter spring comprises three extensible tension spring portions 11, although a greater or lesser number of such sections may be employed. The extensible portions 11 are interconnected with non-extensible portions 12, the connecting means as best seen in Fig. 1a comprising, at the end of section 11, a hook or loop 13, through which passes a hook or loop 14, formed on the end of the non-extensible section 12.

It may readily be understood that, if the garter spring illustrated in Fig. 1 had no non-extensible sections 12, but comprised, instead, an endless circular coil spring of the same sectional diameter as the coils shown in the drawing and of the same circumferential length, the total stretching capacity of the spring would be materially increased, with the result that the stretch given to the spring to dispose it about a circular portion to be urged radially inwardly, usually and preferably a rather moderate stretch, ordinarily would not establish sufficient contractile force for the desired purpose. It will readily be perceived, also, that one would have very little latitude in the selection of spring wire of various gauges in order to obtain a desired substantial contractile force.

The problem is very effectively solved by providing the extensible portions 11 of such aggregate circumferential length as to yield the desired contractile force, while forming the coil springs, comprising the extensible portions 11, of the type of spring wire best suited for the purpose.

Although the non-extensible portions 12 need not necessarily have any substantial resiliency, nevertheless, if those sections have some resiliency, the garter spring as a whole will more completely engage the circular machine portion with which it is associated.

Figure 2:
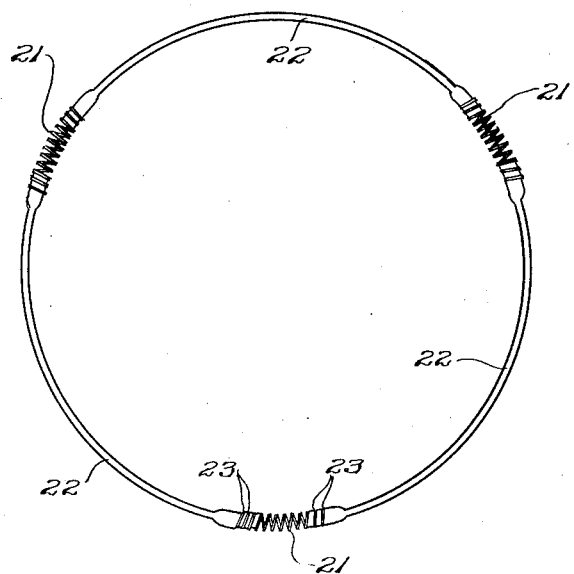
Fig. 2 is an elevational view, illustrating an expansible spring according to the present invention.

The expansible garter spring, illustrated in Fig. 2, employs the same principles described above with reference to Fig. 1, so that the spring may be of narrow cross-sectional diameter, and yet a desired expansive force may be derived by providing three, more or less, extensible compression spring portions 21, of such aggregate length as to yield that desired force. The portions 21 are interconnected, alternately, with non-extensible portions 22. In addition, however, it is preferred that the connections between the portions 21 and 22 be rigid, to prevent any pivotal action therebetween, and that each of the portions 21 be of such short length relatively to its diameter, that the garter spring, upon being compressed, will not tend to become materially deformed; or, stated differently, it will remain circular and in substantially a single plane.

It is well known that a straight compression coil spring, which is relatively short as compared to its diameter, may be compressed endwisely without lateral deformation, even though no guide means are provided to prevent such deformation. The present invention, apparently, utilizes that principle for the first time in garter springs; providing a compression garter spring of the character described which will not tend to become deformed under compression.

Figure 2A:
Fig. 2a is a fragmentary view, illustrating one of various ways in which the extensible and non-extensible portions of the spring of Fig. 2 structure may be rigidly interconnected.

One of many possible types of rigid connections, between the portions 21 and 22, is illustrated in Fig. 2a, in which the end of the portion 22 is somewhat enlarged and is externally threaded to receive several of the end coils 23 of the spring constituting the extensible portion 21. Such connections, or at least the last of such connections being made to complete the circular form of the garter spring, may be effected by holding the non-extensible portion against turning, then turning the adjacent end of the spring oppositely to the direction of the thread on the portion 22, to store a torque load in the spring, and then threading the said spring end onto the threaded end of the non-extensible portion, while releasing the end of the spring to permit the stored torque load therein to turn it into secure threaded relation to the non-extensible portion.

As shown in the drawings, the non-extensible portions, preferably, are of material of a diameter somewhat greater than that of the material of which the spring portions are made, but are of a diameter somewhat less than the overall diameter of a spring portion.

The foregoing description and the accompanying drawing should make it apparent that the present invention provides for garter springs which may be of very substantial circumferential length and very small in sectional diameter, yet capable of yielding contractile or expansive forces of magnitudes otherwise very difficult, if not impossible to provide. The invention makes it possible to derive such desired force, while permitting reasonable latitude in the selection of spring materials employed in the structure. It should be apparent, also, that by limiting the length of each coil spring portion employed in expansible garter springs, and by providing rigid interconnections between the extensible and non-extensible portions thereof, deformation or snaking of such a spring may be avoided.

It should be obvious that the present inventive concept may be practised in many different ways without, however, departing from the invention as defined in the following claims.

What I claim is:

1. A garter spring of relatively small sectional diameter in comparison to its circumferential length, comprising plural, substantially similar portions which are resilient circumferentially of the spring, and a like number of arcuate radially resistant portions which are substantially non-extensible circumferentially of the spring and similar to each other, the said circumferentially resilient and non-extensible portions being alternately interconnected, end to end, substantially in the form of a circle, in a common circumferential line whereby the resilience of the circumferentially resilient portions is effective in a circumferential line corresponding to the circumferential extension of the non-extensible portions, the circumferential length of the circumferentially resilient portions being substantially less than that of the non-extensible portions whereby to substantially limit the circumferential resilience of the spring as a whole, and the alternate interconnection of the two kinds of portions substantially distributing the effect of the circumferential resilience of the spring about its circumference.

2. A garter spring according to claim 1, the said non-extensible portions being also non-contractible circumferentially of the spring, the circumferentially resilient portions being compression coil springs which are interconnected rigidly with said non-extensible, non-contractible portions, and each compression coil spring being sufficiently short, in relation to its diameter, to be substantially non-deformable laterally in response to the imposition of a compressive force endwisely of the coil spring.

ALBERT M. CHAMBERS, Jr.

REFERENCES CITED

The following references are of record in the file of this patent:

UNITED STATES PATENTS

| Number | Name | Date |
| --- | --- | --- |
| 251,483 | Stiles | Dec. 27, 1881 |
| 1,740,957 | Phillips | Dec. 24, 1929 |
| 1,981,846 | Clark | Nov. 27, 1934 |
| 2,132,010 | Barry | Oct. 4, 1938 |
| 2,200,102 | Sepe | May 7, 1940 |

FOREIGN PATENTS

| Number | Country | Date |
| --- | --- | --- |
| 510,764 | Germany | Oct. 23, 1930 |